Jan. 26, 1960 J. HOLAHAN 2,922,595
DRAG FOR FISHING REELS
Filed June 20, 1956
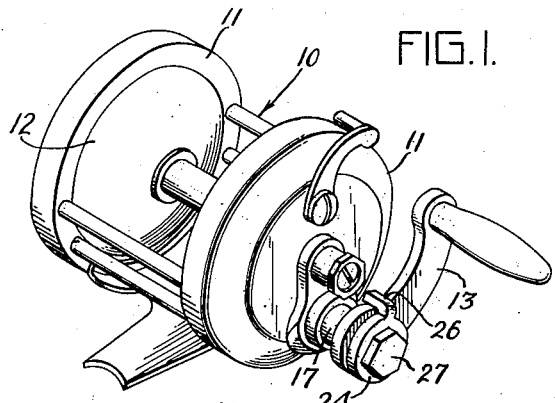
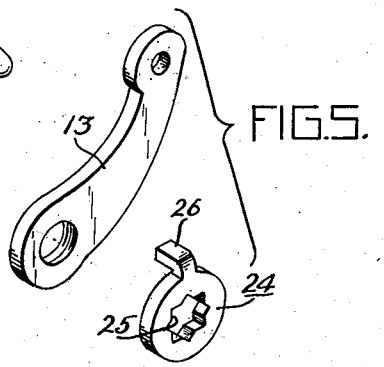
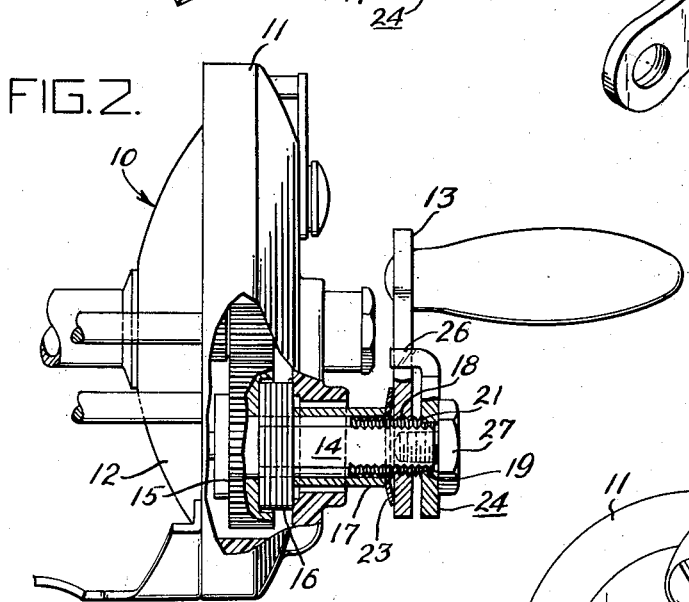
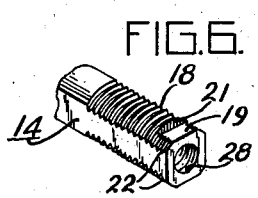
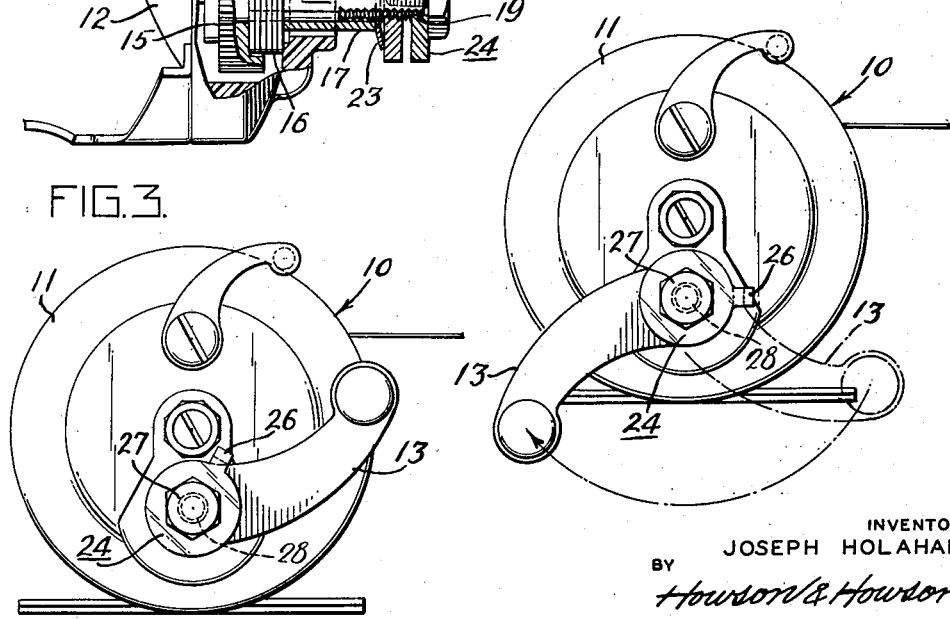
INVENTOR:
JOSEPH HOLAHAN
BY
Howson & Howson
ATTYS.

United States Patent Office 2,922,595
Patented Jan. 26, 1960

2,922,595

DRAG FOR FISHING REELS

Joseph Holahan, Abington, Pa., assignor to True Temper Corporation, a corporation of Ohio Application June 20, 1956, Serial No. 592,653

1 Claim. (Cl. 242—84.54)

The present invention relates to new and useful improvements in drags for fishing reels and more particularly to new and useful improvements in fishing reel drag mechanism wherein the drag is actuated by the winding handle of the fishing reel and the user of the reel may control the amount of drag by placing the handle in the desired position relative to the reel.

Prior to the present invention fishing reel drag mechanisms were usually actuated by means of a star-wheel which was mounted on the reel beneath the handle. In this type of prior drag mechanism, it was difficult in some instances to change the drag on the spool of the reel while playing a fish. According to the present invention the amount of drag on the spool is controlled solely by the winding handle of the reel. If, while reeling in a fish with the reel of the present invention, the fish starts to run and it is desired to decrease the amount of drag on the spool of the reel the handle may be actuated in a direction opposite to the winding direction to thereby decrease the drag and permit the fish to run. In order to exert more drag on the spool of the reel the handle may be moved in the direction for winding the reel and the drag is increased. With this arrangement of drag actuating mechanism it is possible to easily and quickly change the amount of drag on the spool of the reel from a full drag to any desired minimum drag without losing control of the fish.

With the foregoing in mind the principal object of the present invention is to provide a novel drag for a fishing reel which may be actuated solely by moving the handle of the reel.

Another object of the present invention is to provide a novel drag for fishing reels which may easily be set for any desired minimum amount of drag.

Another object of the present invention is to provide a novel drag for fishing reels which may be readily set to apply any desired maximum amount of drag on the spool of the fishing reel.

Another object of the present invention is to provide a novel drag mechanism for fishing reels which may be used on presently existing fishing reels to replace the star-wheel type of drag actuating mechanism.

A further object of the present invention is to provide a novel drag mechanism for fishing reels having the features and characteristics set forth above which is of relatively simplified construction, may be manufactured easily and cheaply, and is highly efficient and effective in operation and use.

These and other objects of the present invention and the various features and details of the operation and construction thereof are hereinafter more fully set forth and described with reference to the accompanying drawing, in which:

Fig. 1 is a perspective view of a fishing reel embodying the drag mechanism of the present invention;

Fig. 2 is an enlarged view of one side of the fishing reel partially in section illustrating the drag mechanism of the present invention;

Fig. 3 is a side view of the fishing reel of Fig. 1 with the handle positioned for a minimum amount of drag on the spool of the reel;

Fig. 4 is a side elevational view similar to Fig. 3 illustrating the handle being moved to a position to increase the drag on the spool of the reel;

Fig. 5 is a perspective view of the handle and stop washer for controlling the minimum amount of drag; and Fig. 6 is a perspective view of the outer end of the gear sleeve about which the drag mechanism is positioned and which carries the handle.

Referring more specifically to the drawings and particularly Figs. 1 and 2 thereof, reference numeral 10 designates generally a conventional fishing reel comprising a pair of side plates 11, 11, a spool 12 and a handle 13 for causing rotation of the spool 12 and also for actuating the drag mechanism.

Rotatably journaled in one side plate of the reel, as illustrated in Fig. 2, is a gear sleeve or gear shaft 14 which rotatably mounts a gear 15 on the inner end thereof. A plurality of friction washers 16 are positioned about the gear sleeve 14 in engagement with one face of the gear 15. The outer of these washers is engaged by a gear sleeve bushing 17 which is positioned about the gear sleeve 14. This is similar to the conventional drag mechanism which is found on most fishing reels. The outer end of the gear sleeve is threaded as indicated at 18 while the extreme outer end of the gear sleeve thereof has a squared portion 19 thereon terminating in a shoulder 21 at the threaded portion 18. In addition, thread segments 22 are provided at the corners at the squared portion 19 to permit the handle 13 to be threaded on to the gear sleeve.

In accordance with the present invention the gear sleeve bushing 17 is adapted to be forced into pressure applying relationship with the drag washers 16 by means of the handle 13 to exert the desired amount of drag on the spool. To this end, a dished or curved spring washer 23 is positioned about the end of the gear sleeve 14 in engagement with the outer face of the gear sleeve bushing 17. The handle member is threaded on the end of the gear sleeve into engagement with the washer 23. As the handle 13 is threaded on the threaded portion 18 of the gear sleeve 14 in the clockwise direction relative to Fig. 3, which is also the direction of rotation of the handle for winding the spool, the inner surface of the handle 13 engages the spring washer 23 and causes the spring washer 23 to force the gear sleeve bushing 17 into engagement with the drag washers 16 thereby increasing the amount of drag on the spool 12. In addition, a washer 24 having a star shaped opening 25 therein is positioned over the outer end of the gear sleeve 14 in engagement with the shoulder 21 and a lug 26 formed integrally with the washer 24 extends inwardly toward the side plate of the reel in the path of travel of the handle 13. The washer 24 is secured in place on the end of the gear sleeve 14 by means of a bolt 27 which is threadedly received in an opening 28 in the outer end of gear sleeve 14. This washer 24 serves to limit the minimum amount of drag which may be placed on the spool 12, as the lug 26 is in the path of travel of the handle 13 and will limit the relative rotation between the handle 13 and the gear sleeve 14.

To assemble the drag mechanism of the present invention the handle 13 is threaded onto the gear sleeve 14 tightly against the spring washer 23 so that full drag is exerted on the spool 12. The washer 24 is then positioned on the end of the gear sleeve 14 with the lug 26 extending inwardly toward the side plate of the reel and positioned in advance of the handle 13 in the direction of rotation of the handle 13 for winding the line on the spool 12. The handle 13 is then rotated in the counterclockwise direction relative to Fig. 3, for example to the position illustrated in Fig. 3 wherein the trailing edge of the handle is in engagement with the washer lug 26. In this position the minimum amount of drag is exerted on the spool 12. If it is desired to increase its minimum drag the handle 13 is rotated in the clockwise direction to a point where the desired minimum drag is on the spool 12 and the washer 24, with its star shaped opening 25, is positioned on the end of the gear sleeve so that the lug 26 is in engagement with the trailing edge of the handle 13. The washer 24 is then locked in this position by means of the bolt 27. In addition, this drag may be set to limit the maximum amount of drag on the spool of the fishing reel. This is accomplished by manually holding the spool stationary and rotating the handle in the clockwise direction to a position wherein the desired maximum drag is exerted on the spool. The washer 24 is then positioned on the end of the gear sleeve with the lug 26 in engagement with the leading edge of the handle and the washer is locked in position by means of the bolt 27. With this arrangement of elements the drag on the spool 12 may be reduced to any desired minimum amount, within limits, by rotating the handle in the counterclockwise direction, but engagement of the leading edge of the handle by the washer 24 and lug 26 limit the maximum drag which may be exerted on the spool 12.

To use a reel embodying the drag mechanism of the present invention, after the line is cast out the handle 13 is rotated in the counterclockwise direction, for example to the position shown in Fig. 3, wherein the desired minimum drag is exerted on the spool. After a fish is hooked, the handle 13 may be rotated clockwise, for example to the position shown in Fig. 4 to increase the amount of drag on the spool. When it is desired to reel the fish in, the handle is rotated clockwise to wind the line about the spool 12. If, during reeling in the fish, the fish starts to pull on the line or run, the drag may be released slightly by rotating the handle counterclockwise.

From the foregoing it will be apparent that the present invention provides a novel drag mechanism for fishing reels wherein the amount of drag on the line may be varied by the user of the reel merely by positioning the handle of the reel in the desired place. In addition, it will be apparent that the invention provides a novel drag mechanism which is of relatively simplified construction, is easy to use, and may be manufactured easily and cheaply.

While a particular embodiment of the present invention has been illustrated and described herein, it is not intended to limit the invention to such a disclosure and changes and modifications may be incorporated and embodied therein within the scope of the following claim.

I claim:

In a fishing reel comprising a pair of end plates rotatably mounting therebetween a spool; a gear shaft drivably connected to the spool operable to cause rotation of the spool, means mounting said gear shaft in one of said end plates with one end thereof projecting outwardly beyond said one end plate, pressure actuated drag mechanism positioned about the gear shaft operable to exert a drag on the spool upon the exertion of pressure on the drag mechanism in a direction axially inward of the gear shaft, a handle member threaded on said gear shaft intermediate said drag mechanism and said one end of said gear shaft and mounted for movement axially of said gear shaft upon rotation of said handle relative to said gear shaft, force transmitting means including a resilient spring member positioned about said gear shaft intermediate said handle member and said drag mechanism in engagement with said drag mechanism, and a stop member adjustably secured to said one end of said gear shaft positioned in the path of rotation of said handle member relative to said gear shaft and operable to limit rotation of said handle member relative to said gear shaft within predetermined limit positions, said handle operable during rotation to one limit position thereof to move axially inward relative to the gear shaft and exert pressure axially inward on said force transmitting means to actuate said drag mechanism and increase the drag on said spool by an amount proportional to the relative movement of the winding handle with respect to the gear shaft and operable during rotation to the other limit position thereof to move axially outward relative to the gear shaft to release the pressure axially inward on said force transmitting means and decrease the drag on the spool, and said stop member operable upon engagement by said handle when said handle reaches said one limit position to cause rotation of said gear shaft with said handle.

References Cited in the file of this patent

UNITED STATES PATENTS

| | | |
|---|---|---|
| 2,209,598 | Coxe | July 30, 1940 |
| 2,485,741 | King | Oct. 25, 1949 |
| 2,648,506 | Kirby | Aug. 11, 1953 |
| 2,783,862 | Perinoni | Mar. 5, 1957 |